Dec. 11, 1923.
C. E. TUCKER
1,476,856
GASOLINE DISPENSING APPARATUS
Filed Dec. 7, 1921
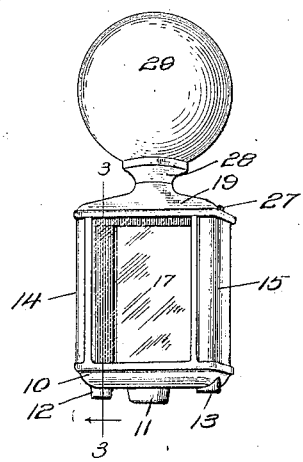
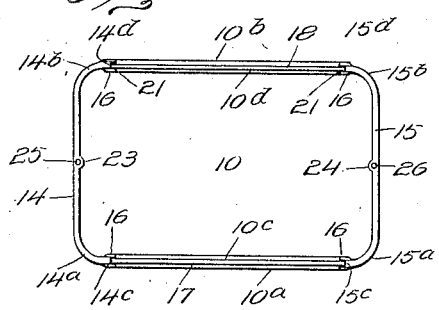
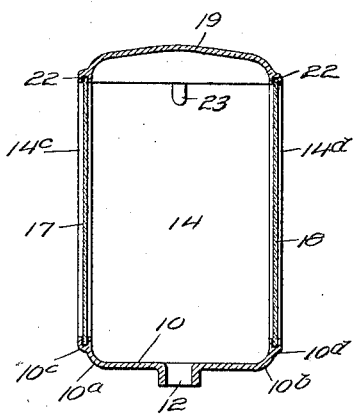
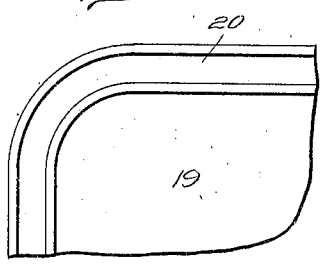
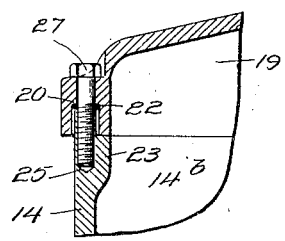
C. E. Tucker, INVENTOR.
BY Geo. P. Kimmel, ATTORNEY.

Patented Dec. 11, 1923.

1,476,856

UNITED STATES PATENT OFFICE.

CHARLES E. TUCKER, OF YORK, PENNSYLVANIA.

GASOLINE-DISPENSING APPARATUS.

Application filed December 7, 1921. Serial No. 520,607.

*To all whom it may concern:*

Be it known that I, CHARLES E. TUCKER, a citizen of the United States, residing at York, in the county of York and State of Pennsylvania, have invented certain new and useful Improvements in Gasoline-Dispensing Apparatus, of which the following is a specification.

This invention appertains to certain improvements in gasoline dispensing devices or stations generally, and more particularly to a type of the same employing a measuring and dispensing chamber or compartment wherein the amount of gasoline to be delivered from the chamber or compartment is plainly visible to the purchaser thereof.

The principal object of the invention is to provide for a dispensing device of the class mentioned, and one wherein the measuring and dispensing chamber or compartment of the same is provided with one or more flat transparent sides in lieu of the usual cylindrical transparent or glass walled chamber or compartment now commonly used in such devices.

Another object of the invention is to provide for a novel form of mounting for the flat transparent or glass wall or walls of the measuring and dispensing chambers or compartments of gasoline dispensing devices, and one of an extremely simple construction and arrangement, and of a nature admitting of a clear and unobstructed view of the interior of the chamber or compartment and the liquid contents thereof, and wherein all possible chance for short measure, either accidental or intentional, is reduced to a minimum.

A further object of the invention is to provide for a novel method of fastening flat sheets or plates of transparent materials, such as glass or the like, in position to provide for a clear and unobstructed view to the interior of measuring and dispensing chambers or compartments of gasoline dispensing devices and to the measured contents thereof, and which is durable and efficient in continued operation, and wherein all possible chance for leakage of the gasoline from the chamber or compartment is reduced to a minimum.

With the foregoing and other objects in view, the invention resides in the certain novel and useful construction and arrangement of parts, as will be hereinafter more fully described, set forth in the appended claims, and illustrated in the accompanying drawing, in which:—

Figure 1 is a perspective view of the upper portion of the dispensing chamber or compartment of a gasoline dispensing device or station as constructed and arranged in accordance with the invention, Fig. 2 is a plan view of the upper end of the dispensing chamber or compartment with the closure or cover portion thereof removed, Fig. 3 is a vertical section taken on the line 3—3 of Fig. 1, Fig. 4 is an enlarged detail view of a portion of the dispensing chamber or compartment, and showing the manner of securing one end of a transparent sheet of glass wall in position, Fig. 5 is an enlarged fragmentary section showing the manner of securing the closure or cover in position of the upper end of the dispensing chamber or compartment, and, Fig. 6 is an enlarged detail view of a portion of the upper side of the closure or cover or the dispensing chamber or compartment.

Referring to the drawing, wherein similar characters of reference designate corresponding parts throughout the several views thereof, the preferred embodiment of the dispensing chamber or compartment as shown comprises a metal housing formed to provide a bottom wall 10 having a supporting boss or portion 11 projecting centrally of the under side thereof, and gasoline inlet and outlet nipples or bosses 12 and 13 also projecting from the under side of the wall and to either side of the central boss or portion 11. Rising from the opposite end edges of the base portion or bottom wall 10 are vertically extending end walls 14 and 15, each having their opposite vertical edge portions $14^a$, $14^b$, and $15^a$, $15^b$, curved inwardly toward the other, whereby the complemental edge portions $14^a$, $15^a$, and $14^b$, $15^b$, are opposed one to the other. The free vertical edges of these portions, $14^a$, $14^b$, $15^a$, and $15^b$, are thickened, as at 16, and have their facial edges formed to provide vertically extending grooves or channels $14^c$, $14^d$, $15^c$ and $15^d$ respectively, while the bottom wall 10 has the opposite side portions $10^a$, $10^b$ of its upper face formed to provide grooves or channels $10^c$, $10^d$, in alignment with and connecting the lower ends of the complemental grooves or channels $14^c$, $15^c$, and 14ᵈ, 15ᵈ, respectively. As is clearly shown in Figures 2, 4 and 5, the upper edges of the end walls 14 and 15 and their opposite curved edge portions 14ᵃ, 14ᵇ, and 15ᵃ, 15ᵇ, are extended for a slight distance above the plane of the upper ends of the thickened opposed vertical edge portions thereof for purposes which will be hereinafter more fully explained.

With the body of the container thus formed, sheets or plates of glass or the like 17 and 18 are inserted downwardly of the grooves or channels 14ᶜ, 15ᶜ, and 14ᵈ, 15ᵈ, respectively, of the vertical end walls 14 and 15, and until their lower end edges seat in the complemental grooves or channels 10ᶜ, 10ᵈ, of the bottom wall 10, when the upper edges thereof will be disposed in the plane of the upper edges of the end walls 14 and 15, and the opposite curved side portions 14ᵃ, 14ᵇ and 15ᵃ, 15ᵇ, thereof, the latter of said upper edges being of substantially the same thickness as that of the sheets or plates of glass 17 and 18. A closure or cover 19 is now positioned on the upper open end of the chamber or compartment and has its under surface formed to provide an endless groove or channel 20, which fits over and engages the upper edges of the end walls 14 and 15 and the corresponding edges of the transparent sheets or plates 17 and 18. To prevent leakage of the liquid from the compartment or chamber, the grooves in the bottom and end walls 10, 14 and 15 thereof are preferably filled with a cement or packing 21, in which the lower end and side edges of the transparent sheets or plates 17 and 18 are embedded for such purpose, while the groove 20 in the closure or cover 19 is provided with a packing 22 only, whereby to also prevent any leakage around the engaged edges of the end walls 14 and 15 and the transparent sheets or plates 17 and 18, but, at the same time, admit of the removal of the closure or cover 19 for ready access to the interior of the chamber or compartment when desired.

For the purpose of fastening the closure or cover 19 in position on the upper end of the chamber or compartment, the inner faces of the opposite end walls 14 and 15 of the latter, are formed to provide medially disposed enlargements 23 and 24 having their upper faces disposed substantially in the plane of the upper end faces of the grooved thickened vertical edges 16 of the end walls 14 and 15 whereby the closure or cover 19 is supported directly on the several upper end faces, and the enlargements 28 and 24 are each provided with threaded openings 25 and 26 for the reception of machine screws or the like 27, substantially as is shown in Figure 5. As shown in Figure 1, the closure or cover 19 may be provided with a central boss or the like 28 for supporting in position thereon an ordinary form of advertising transparent or glass globe 29, inclosing an electric lamp (not shown), whereby the dispensing device as a whole will be illuminated at night or in cloudy or stormy weather.

From the foregoing, it will be readily apparent that, while a preferred embodiment of the dispensing chamber or compartment has been described and illustrated herein in specific term and detail of construction and arrangement wherein various changes in and modifications of the same may be resorted to without departing from the spirit of the invention, or the scope of the claims appended hereto.

Having thus fully described the invention, what is claimed, is:—

1. In a dispensing chamber for gasoline dispensing devices and the like, a metal casing open at its top and opposite sides and formed with channels co-extensively with the walls of the open sides and the bottom thereof, flat transparent plates closing the open sides of said casing and having their opposite side and lower end edges engaged in the said channels, packing disposed within the said channels and about the engaged edges of said transparent plates, and a cover removably closing the open top of said casing.

2. In a dispensing chamber for gasoline dispensing devices and the like, a metal casing open at its top and opposite sides and formed with channels co-extensively with the walls of the open sides and the bottom thereof, flat transparent plates closing the open sides of said casing and having their opposite side and lower end edges engaged in the said channels, packing disposed within the said channels and about the engaged edges of said transparent plates, a cover closing the open top of said casing, an endless channel formed in the under side of said cover and adapted to engage the upper edges of the end walls of said casing and of said transparent plates, and means for fastening said cover in position.

3. In a dispensing chamber for gasoline dispensing devices and the like, a metal casing open at its top and opposite sides and formed with channels co-extensively with the walls of the open sides and the bottom thereof, flat transparent plates closing the open sides of said casing and having their opposite side and lower end edges engaged in the said channels, packing disposed within the said channels and about the engaged edges of said transparent plates, a cover closing the open top of said casing, an endless channel formed in the under side of said cover and adapted to engage the upper edges of the end walls of said casing and of said transparent plates, a packing disposed within said endless channel of said cover and in leak proof contact with the said upper edges of the end edges of said casing and transparent plates, and means for removably fastening said cover in position.

4. In a dispensing chamber for gasoline dispensing devices and the like, a metal casing formed to provide a bottom wall and oppositely disposed end walls rising from the bottom wall, channels formed in the opposite side edges of said end walls and in alignment with and connected at their lower ends to similar channels formed in the upper face of said bottom wall, flat glass plates closing the open sides of said casing and having their opposite side and lower end edges engaged in the said channels of the end and bottom walls of said casing, cement disposed within the said channels and having the engaged edges of said flat glass plates embedded therein, a cover closing the open top of the casing, an endless channel formed in the under face of said cover and adapted to engage over the upper end edges of the end walls of said casing and of said glass plates, a packing disposed within the said endless channel of said cover and in leak proof contact with the engaged edges of the said end walls and glass plates, and means for removably securing said cover in position.

In testimony whereof, I hereby affix my signature hereto.

CHARLES E. TUCKER.

Witness:
H. M. NESS.